Feb. 4, 1930.   H. W. ORNDOFF   1,745,444
CLAMPING DEVICE
Filed Oct. 12, 1928   3 Sheets-Sheet 1
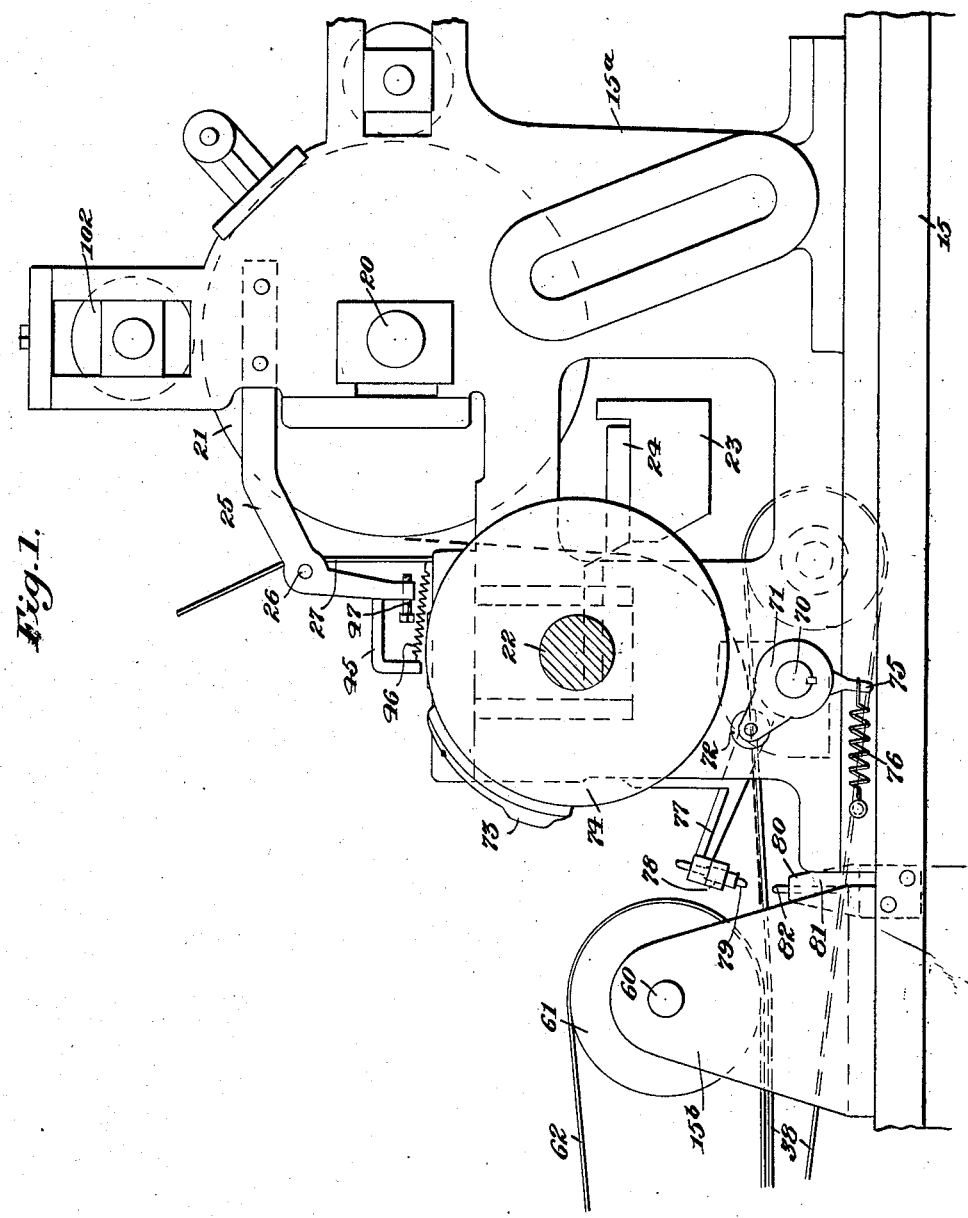
Inventor:
Herbert W. Orndoff,
By Sturtevant & Mason,
Att'ys.

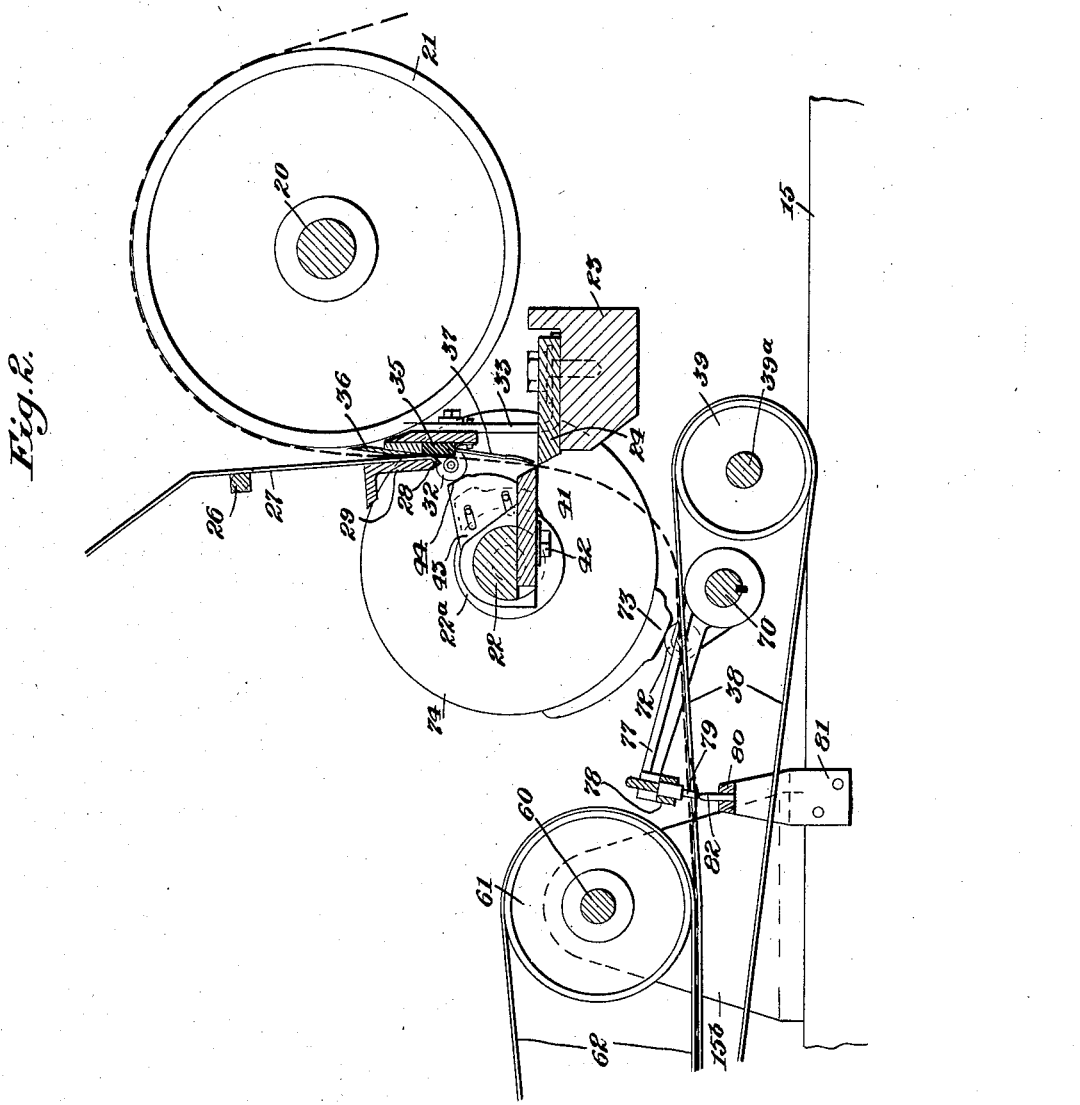

Feb. 4, 1930. H. W. ORNDOFF 1,745,444
CLAMPING DEVICE
Filed Oct. 12, 1928 3 Sheets-Sheet 3

Inventor:
Herbert W. Orndoff,
By Stuvesant & Mason,
Att'ys.

Patented Feb. 4, 1930

1,745,444

UNITED STATES PATENT OFFICE

HERBERT W. ORNDOFF, OF NEW ORLEANS, LOUISIANA, ASSIGNOR TO THE E. V. BENJAMIN CO., INC., OF NEW ORLEANS, LOUISIANA, A CORPORATION OF LOUISIANA, TRADING AS MAGINNIS COTTON MILLS

CLAMPING DEVICE

Application filed October 12, 1928. Serial No. 312,169.

This invention relates to a clamping device for employment in a web cutting machine, and is particularly adapted for employment in such machines as utilize a continuous supply of web to the cutting mechanism; and constitutes an addition and improvement to the clamping device shown by my copending application Serial No. 301,909 filed Aug. 24, 1928, to which reference is made for certain details of construction and operation.

As set forth in that application, it has been found that in practice it is desirable that the cutting blades should operate progressively across the width of the fabric, in order to avoid the jerk in the driving system which might occur if the knife were designed to operate instantaneously for the desired width, and also to gain the advantage of a progressive or scissors-like cut with a lesser power demand upon the driving system. When it is attempted to accomplish this, however, with a continuous supply of web material for the cutting device, the cutting is apt to be distorted away from the true right angle across the web.

According to the present invention, means are provided for clamping the web both in front of and behind the cutting knife. This is particularly of advantage when a continuously operating delivery system tends to remove the cut sheet or blank as it is severed, since by clamping the sheet and holding it against such removal, the cut is completed without relative dragging on the portion which has already been cut away from the continuous web.

Other features of the present invention are shown in the course of the following specification and claims, and an illustrative example of employment of the invention is shown on the accompanying drawings, in which:

Figure 1 is an end view, with parts broken away, of a machine showing the arrangement of the supplying, cutting, clamping and delivery means.

Fig. 2 is a diagrammatic sectional view, taken parallel to Fig. 1, and showing the relationship of the several parts at the moment of clamping and cutting.

Fig. 3 is a top plan view of the machine, with central parts broken away, and others eliminated for greater clearness.

In these drawings, the machine has a fixed table plate 15, with upwardly extending standards 15ª thereon providing a bearing for the shaft 20 of the measuring drum 21. The standards 15ª also have a bearing for the cutting shaft 22. Brackets 23 carry a fixed knife 24. Further brackets 15ᵇ support the shaft 60 for a plurality of guide rollers 61 for the upper conveyor tape 62.

Arms 25 rigidly supported on the standards 15ª are provided with pivots 26 to pivotally support a swinging plate 27 which extends for the full width of the web and has an angularly bent bottom edge 28. This plate is stiffened at its lower end by an angle iron 29 riveted thereto. At the lower edge of the plate and angle iron is a roller bracket to support the roller 32. Mounted on the shaft 22 is a plate 22ª to which is clamped a cam member 43 having a raised peripheral "hump" 44. When a low portion of the cam is opposite the roller 32, the plate 27 is pulled in a clockwise direction by the coil spring 46 secured to the bracket 45 until this plate is arrested by the adjustable stop member 47. When the raised portion or hump 44 of the cam operates upon the roller 32, the plate 27 is rocked in a clockwise direction and its lower angle is brought against a stationary pad 35, for example of rubber, whereby the fabric passing over the measuring roller 21 is clamped against further movement at this point. A guide plate 36 carries the web forward from the periphery of the measuring drum 21, and forms in conjunction with the swinging plate 27 a V-shaped pocket in which the material accumulates during the time that the web is held stationary by the clamp 28, 35. The pad 35 and guide plate 36 are supported on a further bracket 33 of the transverse strut 23 of the machine frame, which supports the stationary knife 24 proper.

The revolving shaft 22 likewise supports the revolving knife 41 which is of helical form and is held in position by the clamping bolts 42. It may be pointed out as a specific instance, that the angular displacement about the cutting shaft of the two ends of the helical cutting edge of the revolving knife, with respect to each other, is about five-eighths of an inch for a knife length of fifty inches. The hump 44 on the cam 43 is therefore designed to have a "dwell" of slightly greater than five-eighths of an inch in peripheral distance, so that the clamping is maintained for the whole interval that the knives are operating upon the web. It is preferred to provide a lower guide 37 supported on bracket 33 to carry the edge of the material to a point beyond the cutting edge of the stationary knife 24.

As the web of material is advanced past the clamp 28, 35 while the elements of the latter are open, and past the edge of the stationary knife 24, it comes down upon the upper flight of conveyor tapes 38 which pass over the guide rollers 39 of a shaft 39$^a$. The upper flight of the tapes 38 is moving continuously toward the left in the figures, so that the advancing edge of the sheet is soon brought beneath the lower flight of the conveying tapes 62 which are traveling in the same direction, so that the material of the web is clamped between the two lines of tape and is positively fed forward for some ultimate use.

A transverse rock shaft 70 is journaled in the side standards 15$^a$ of the machine frame, and projects at the near side thereof in Fig. 1, and receives a rock arm 71 which carries the roller 72 opposite a cam 73 fixed to a disk 74 keyed to the shaft 22. A downwardly extending arm 75 of the rock lever 71 engages a return spring 76 which continuously tends to rock the shaft 70 in a clockwise direction. Just inside the end frame 15$^a$ of the machine, the rock shaft 70 carries the clamping arms 77 which support the transverse clamping bar 78, in which are mounted a plurality of pins 79 at fixed intervals, so that the pins are substantially intermediate the positions of the several tapes 38, 62.

A stationary transverse bar 80 is carried by the side brackets 81, and itself supports a plurality of stationary pins 82 which are arranged opposite the movable pins 79 so as to cooperate therewith for clamping the web and sheet of fabric. The tops or points of the pins 82 are located beneath the plane established by the upper surface of the upper flight of the conveying tapes 38 (Fig. 2), so that a sheet moving forward on the tapes 38 is not brought into contact with the pins 82, and thus no obstacle is normally afforded to the advancement of the sheet or blank.

The driving system for the various elements is shown in Fig. 3 to comprise means for driving the measuring drum 21, such as the gear 100 fixed to the shaft 20. The shaft 20 likewise has fixed thereto a sprocket wheel 51 for a chain 52 cooperating with a sprocket wheel 50 on the cutting shaft 22; the knife therefore moves in synchronism with the movement of the measuring drum 21. The shaft 22 likewise supports a sprocket 54 for a chain 53 which serves to drive a sprocket on the shaft 60 of the upper conveyor tapes 22. Suitable means, including the pulley 101 for example on the shaft 60, are employed to drive the shaft 39$^a$ for the guide roller 39 of the roller tapes 38. It will be noted that these elements are thus driven continuously at a constant speed.

The method of operation of this device is as follows:

The web of fabric is fed over the measuring drum 21 and by some suitable means such as the guiding roll 102 (Fig. 1), is caused to advance at the same peripheral speed as the measuring drum 21 itself. The web of fabric thus passes over the guide members 36, 37 and the cutting edge of the stationary knife 24 into contact with the upper or rapidly moving flight of the tapes 38, and is thus brought between the tapes 38 and the tapes 62, these tapes thereafter advancing the forward edge of the blank. The relative speeds of the measuring drum 21 and of the knife shaft 22 are so proportioned that the moving knife 41 is brought into cutting relationship with the fixed knife 24 from time to time, and the blanks are severed from the web. It is preferred to provide the drive through the sprocket 54 and chain 53 such that the tapes 38 and 62 move at a slightly greater speed than the peripheral speed of the measuring drum 21, so that in effect the cut blanks are spaced slightly apart as they move along between the tapes 38 and 62.

Just prior to the instant when the moving knife encounters the fixed knife 24 for severing a blank from the continuously advancing web, the cams 44 and 73 are respectively brought into engagement with their rollers 32, 72, and cause a rocking of the swinging plate 27 and the arms 77 about their respective axes 26, 70, so that the swinging plate 27 engages the web of fabric against the pad 35 and clamps the web against further advancement with respect to the portion beneath the point of engagement, while permitting the remaining portion of the web to collect in the space between the swinging plate 27, the guide plate 26 and the periphery of the measuring drum 21 itself; while the arms 77 cause the movable pin 79 to bear down upon the portion of the web lying thereberneath, thus depressing the parts of this web lying between the lines of tape 38 into contact with the stationary pins 82, so that the fabric is also clamped against being drawn forward by the engagement with tapes 38 and 62. This clamping is continued for the period during which the moving knife 41 is operating to sever the blank. Shortly after this action has ceased, the cams 44, 73 release their respective rollers 32, 72, and the swinging plate 27 is retracted by its spring 47 and the arms 77 are retracted by the springs 76. The end of the web itself is now free to move downward, and the portion which has collected adjacent the swinging plate 27 is released, and the front edge of the web passes downward over the edge of the fixed knife 24, the web being guided by the plate 37, and with the further advancement of the measuring drum 21, the front edge of the fabric is brought into contact with the upper flight of tapes 38 and is carried toward the left in Fig. 2 until the moving knife 41 is again nearly in a position to sever the forthcoming blank.

It is apparent that the invention is not limited solely to the form of execution shown, but that it may be employed in many ways in the arts without departing from the scope of the appended claims.

What I claim as new and desire to secure by Leters Patent is:

1. In a clamping and cutting mechanism for severing sheets from a web, a continuously moving feeding device, an intermittently operating cutting device, and a clamping means to clamp the web against advancement at a point between the feeding device and the cutting device, a clamping means to clamp the web against advancement at a point beyond the cutting device, and means operated synchronously with the continuously moving feeding device to actuate said clamping means during the operation of said cutting device.

2. In a clamping and cutting mechanism for severing sheets from a web, a continuously operating feeding device, an intermittently operating cutting device, a continuously operating delivery device to engage the web and blank after it has passed the cutting device, means to retain said web against advancement at the line of cut, and means operated synchronously with said feeding and delivery devices to actuate said retaining means during the operation of said cutting device.

3. In a clamping and cutting mechanism for severing sheets from a web, an intermittently operating cutting device, a continuously operating delivery device to advance the web or sheet after passing said cutting device, clamping means located to operate upon said web after leaving said cutting device, and means controlled with said intermittent cutting device to actuate said clamping means during the cutting.

4. In a clamping and cutting mechanism for severing sheets from a web, an intermittently operating cutting device, a continuously operated delivery device to advance the web and and sheet after passing the said cutting device and including a plurality of spaced tapes, clamping means including fixed and moving pins located between said tapes, and means operated with said cutting device to actuate said clamping fingers during the cutting.

5. In a clamping and cutting mechanism for severing sheets from a web, a continuously rotating cutter shaft, an intermittently operating cutter on said shaft, a cooperating cutter blade, a plurality of delivery tapes to advance the sheet after passing said cutter, a transverse bar having projections thereon, said projections being located out of the plane of advancement of the web or sheet on said tapes, a plurality of movable clamping members to cooperate with said projections, said projections and movable members being spaced intermediate said tapes, and means controlled by the said cutter shaft in its rotation to bring said clamping members and projections together whereby to clamp the web against movement while the cutter is operating.

6. In a clamping and cutting mechanism for severing sheets from a web, a continuously operated feeding device, a continuously rotating cutting shaft, a cutting blade on said shaft, a cooperating fixed cutter blade, a continuously operated delivery device to advance the web and sheet after passing said cutter and blade, clamping means to clamp the web between said feeding device and said cutter and blade, clamping means to clamp said web after passing said cutter and blade, cams mounted on said cutting shaft, and means cooperating with said cams to actuate said clamping means during the operation of said cutter and blade.

In testimony whereof, I affix my signature.

HERBERT W. ORNDOFF.